United States Patent
Hulsey

(10) Patent No.: US 9,088,367 B2
(45) Date of Patent: Jul. 21, 2015

(54) UNI-FIBER LASERCOM TERMINAL DESIGN

(71) Applicant: THE BOEING COMPANY, Chicago, IL (US)

(72) Inventor: Daniel Eric Hulsey, Florissant, MO (US)

(73) Assignee: THE BOEING COMPANY, Chicago, IL (US)

( * ) Notice: Subject to any disclaimer, the term of this patent is extended or adjusted under 35 U.S.C. 154(b) by 333 days.

(21) Appl. No.: 13/770,906

(22) Filed: Feb. 19, 2013

(65) Prior Publication Data

US 2014/0233958 A1 Aug. 21, 2014

(51) Int. Cl.
G02B 26/08 (2006.01)
H04B 10/40 (2013.01)
H04B 10/112 (2013.01)

(52) U.S. Cl.
CPC ............ H04B 10/40 (2013.01); G02B 26/0858 (2013.01); H04B 10/1125 (2013.01)

(58) Field of Classification Search
CPC .. G02B 26/101; G02B 6/2861; G02B 6/4201; G02B 26/0833; G02B 26/0841; H04B 10/60; H04B 10/1125; H04B 10/40
USPC .......... 359/198.1–199.4, 200.6–200.8, 209.1, 359/212.1–215.1, 223.1–226.2; 398/93, 99, 398/130, 137–139
See application file for complete search history.

(56) References Cited

U.S. PATENT DOCUMENTS

| | | | |
|---|---|---|---|
| 5,835,199 A | * | 11/1998 | Phillips et al. ............... 356/5.03 |
| 7,224,508 B2 | | 5/2007 | Chalfant, III et al. |
| 7,612,317 B2 | | 11/2009 | Chalfant, III et al. |
| 8,160,452 B1 | | 4/2012 | Tidwell et al. |
| 2004/0042798 A1 | | 3/2004 | Kehr et al. |
| 2004/0208597 A1 | | 10/2004 | Wittenberger et al. |
| 2005/0069325 A1 | | 3/2005 | Cicchiello et al. |
| 2010/0178053 A1 | * | 7/2010 | Sagawa et al. .................. 398/35 |

FOREIGN PATENT DOCUMENTS

WO 2007016537 A2 2/2007

OTHER PUBLICATIONS

Extended European Search Report, Application No. 14155393.3-1860, Jun. 26, 2014.

(Continued)

*Primary Examiner* — James Phan
(74) *Attorney, Agent, or Firm* — Vista IP Law Group LLP; Cynthia A. Dixon

(57) ABSTRACT

A method, system, and apparatus for a uni-fiber laser communications (lasercom) terminal are disclosed herein. The apparatus includes an oscillator to generate a first signal having a first wavelength, and a modulator to modulate the first signal. The apparatus further includes a circulator to circulate the first signal, and a bi-directional optical amplifier (optical amp) to amplify the first signal. Also, the apparatus includes an optical fiber, which is embedded in a ferrule, and an end of the ferrule is coated with a reflective coating. Additionally, the apparatus includes at least one lens, where the first signal is transmitted through and received through the optical fiber and at least one lens. Also, the apparatus includes an acquisition detector to detect the first signal. Further, the apparatus includes an actuator associated with the ferrule to nutate and translate the ferrule according to feedback from the acquisition detector regarding the first signal.

34 Claims, 8 Drawing Sheets

(56) References Cited

OTHER PUBLICATIONS

Maryam Amin Nasrabadi and Mohammad Hassan Bastani, "A Survey on the Design of Binary Pulse Compression Codes with Low Autocorrelation, Trends in Telecommunications Technologies", Christos J. Bouras (Ed.), ISBN: 978-953-307-072-8, In Tech, 2010.

E.E. Fenimore and T.M. Cannon, "Coded Aperture Imaging with Uniformly Redundant Arrays", Appl. Opt. 17, 337 (1978).

S. Lee and C. Chae, "Low-Cost Bidirectional Optical Amplifier Using a Unidirectional Er-Doped Fiber Amplifier and a Fiber Match, Zehnder Interferometer", IEEE Photonics Technology Letters, vol. 13, No. 1, Jan. 2001.

B. Kang and C. Kim, "Performance Evaluation of Bidirectional Optical Amplifiers for Amplified Passive Optical Network Based on Broadband Light Source Seeded Optical Sources", Journal of Optical Society of Korea, vol. 15, No. 1, pp. 4-8, Mar. 2011.

* cited by examiner

|  | Conventional Terminal | Uni-Fiber |
|---|---|---|
| Aperture Size | 3.5" | 1.0" |
| Optical Head Dimensions | 13.5" x 13.5" x 24.0" | 3" x 4" x 7" |
| Mass: Optics Electronics | 50 lbs<br>54 lbs | 5 lbs<br>54 lbs |
| Tx Power | 500 mW | 250 mW |
| Power Consumption | 82 W | 60 W |

FIG. 8

UNI-FIBER LASERCOM TERMINAL DESIGN

BACKGROUND

The present disclosure relates to laser communications (lasercom) terminals. In particular, it relates to a uni-fiber lasercom terminal.

SUMMARY

The present disclosure relates to a system, method, and apparatus for uni-fiber laser communications (lasercom) terminals. In particular, the disclosed method for a uni-fiber (i.e. a single optical fiber) lasercom terminal involves generating, with an oscillator, a first signal having a first wavelength ($\lambda_1$). The method further involves modulating, with a modulator, the first signal. Also, the method involves circulating, with a circulator, the first signal. In addition, the method involves amplifying, with a bi-directional optical amplifier (optical amp), the first signal. Additionally, the method involves transmitting, through an optical fiber, the first signal. In one or more embodiments, the optical fiber is embedded in a ferrule, and an end of the ferrule is coated with a reflective coating. In addition, the method involves transmitting, through at least one lens, the first signal. Additionally, the method involves receiving, through at least one lens and the optical fiber, the first signal. Also, the method involves amplifying, with the bi-directional optical amp, the first signal. Additionally, the method involves circulating, with the circulator, the first signal. In addition, the method involves detecting, with an acquisition detector, the first signal. Further, the method involves nutating and translating, with an actuator associated with the ferrule, the ferrule according to feedback from the acquisition detector regarding the first signal.

In one or more embodiments, the method further involves receiving, through at least one lens and the optical fiber, a second signal having a second wavelength ($\lambda_2$). In addition, the method further involves amplifying, with the bi-directional optical amp, the second signal. Also, the method further involves circulating, with the circulator, the second signal. In addition, the method further involves separating, with a wavelength division multiplexer (WDM), a third signal (which comprises the first signal and the second signal) into the first signal and the second signal. Additionally, the method further involves detecting, with a communication detector, the second signal.

In at least one embodiment, the method further involves reflecting the first signal and/or the second signal off at least one mirror associated with at least one lens. In some embodiments, at least one of the mirrors is capable of being gimbaled.

In one or more embodiments, the actuator is a piezo-electric actuator. In at least one embodiment, the reflective coating on the end of the ferrule is a cat's eye reflector. In some embodiments, the detecting of the first signal by the acquisition detector is achieved by time division multiple access (TDMA) and/or correlation detection. In one or more embodiments, the optical fiber and/or the ferrule are tapered to minimize backreflection.

In at least one embodiment, a uni-fiber lasercom terminal apparatus includes an oscillator to generate a first signal having a first wavelength ($\lambda_1$). In one or more embodiments, the apparatus further includes a modulator to modulate the first signal. Also, the apparatus includes a circulator to circulate the first signal. In addition, the apparatus includes a bi-directional optical amp to amplify the first signal. Additionally, the apparatus includes an optical fiber; where the optical fiber is embedded in a ferrule, and an end of the ferrule is coated with a reflective coating. In addition, the apparatus includes at least one lens. In at least one embodiment, the first signal is transmitted through and is received through the optical fiber and at least one lens. Also, the apparatus includes an acquisition detector to detect the first signal. Further, the apparatus includes an actuator associated with the ferrule to nutate and translate the ferrule according to feedback from the acquisition detector regarding the first signal.

In one or more embodiments, the bi-directional optical amp of the apparatus is further to amplify a second signal, having a second wavelength ($\lambda_2$), that is received through the optical fiber and at least one lens. In at least one embodiment, the circulator of the apparatus is further to circulate the second signal. In some embodiments, the apparatus further includes a WDM to separate a third signal (which comprises the first signal and the second signal) into the first signal and the second signal. In addition, the apparatus further includes a communication detector to detect the second signal.

In at least one embodiment, the apparatus further includes at least one mirror, associated with at least one lens, to reflect the first signal and/or the second signal. In one or more embodiments, at least one of the mirrors is capable of being gimbaled. In some embodiments, the acquisition detector detects the first signal by TDMA and/or correlation detection.

In one or more embodiments, a method for operating a uni-fiber lasercom terminal system involves generating, with an oscillator associated with a first terminal, a first signal having a first wavelength ($\lambda_1$). The method further involves modulating, with a modulator associated with the first terminal, the first signal. Also, the method involves circulating, with a circulator associated with the first terminal, the first signal. In addition, the method involves amplifying, with a bi-directional optical amp associated with the first terminal, the first signal. Additionally, the method involves transmitting, through an optical fiber associated with the first terminal, the first signal. In one or more embodiments, the optical fiber is embedded in a ferrule, and an end of the ferrule is coated with a reflective coating. In addition, the method involves transmitting, through at least one lens associated with the first terminal, the first signal. Additionally, the method involves reflecting, by a reflective surface associated with a second terminal, the first signal. Also, the method involves receiving, by the first terminal through at least one lens associated with the first terminal and the optical fiber associated with the first terminal, the reflected first signal. In addition, the method involves amplifying, with the bi-directional optical amp associated with the first terminal, the reflected first signal. Additionally, the method involves circulating, with the circulator associated with the first terminal, the reflected first signal. Also, the method involves detecting, with an acquisition detector associated with the first terminal, the reflected first signal. The method further involves nutating and translating, with an actuator associated with the ferrule of the first terminal, the ferrule of the first terminal according to feedback from the acquisition detector regarding the reflected first signal.

In at least one embodiment, the method further involves receiving, by the first terminal through at least one lens associated with the first terminal and the optical fiber associated with the first terminal, a second signal from the second terminal, where the second signal has a second wavelength ($\lambda_2$). In addition, the method further involves amplifying, with the bi-directional optical amp associated with the first terminal, the second signal. Additionally, the method further involves circulating, with the circulator associated with the first terminal, the second signal. Also, the method further involves separating, with a WDM associated with the first terminal, a third signal (which comprises the first signal and the second signal) into the first signal and the second signal. In addition, the method further involves detecting, with a communication detector associated with the first terminal, the second signal.

In one or more embodiments, the method further involves reflecting the first signal and/or the second signal off at least one mirror associated with at least one lens associated with the first terminal. In at least one embodiment, at least one of the mirrors of the first terminal is capable of being gimbaled. In some embodiments, the reflective surface associated with the second terminal is a cat's eye reflector.

In at least one embodiment, a system for uni-fiber lasercom terminals includes an oscillator, associated with a first terminal, to generate a first signal having a first wavelength ($\lambda_1$). The system further includes a modulator, associated with the first terminal, to modulate the first signal. In addition, the system includes a circulator, associated with the first terminal, to circulate the first signal. Also, the system includes a bi-directional optical amp, associated with the first terminal, to amplify the first signal. Additionally, the system includes an optical fiber associated with the first terminal, where the optical fiber is embedded in a ferrule, and an end of the ferrule is coated with a reflective coating. Also, the system includes at least one lens associated with the first terminal. In one or more embodiments, the first signal is transmitted through and is received through the optical fiber associated with the first terminal and at least one lens associated with the first terminal. In addition, the system includes a reflective surface, associated with a second terminal, to reflect the first signal. Additionally, the system includes an acquisition detector, associated with the first terminal, to detect the reflected first signal. Further, the system includes an actuator, associated with the ferrule of the first terminal, to nutate and translate the ferrule of the first terminal according to feedback from the acquisition detector regarding the reflected first signal.

In one or more embodiments, the bi-directional optical amp, associated with the first terminal, is further to amplify a second signal, from the second terminal and having a second wavelength ($\lambda_2$), that is received through the optical fiber associated with the first terminal and at least one lens associated with the first terminal. In some embodiments, the circulator, associated with the first terminal, is further to circulate the second signal. In at least one embodiment, the system further includes a WDM, associated with the first terminal, to separate a third signal (which comprises the first signal and the second signal) into the first signal and the second signal. In addition, the system further includes a communication detector, associated with the first terminal, to detect the second signal.

In at least one embodiment, the system further includes at least one mirror, associated with at least one lens of the first terminal, to reflect the first signal and/or the second signal. In some embodiments, at least one of the mirrors of the first terminal is capable of being gimbaled.

In one or more embodiments, the reflective coating on the end of the ferrule of the first terminal is a cat's eye reflector. In some embodiments, the acquisition detector, associated with the first terminal, detects the reflected first signal by TDMA and/or correlation detection. In at least one embodiment, the reflective surface associated with the second terminal is a cat's eye reflector.

The features, functions, and advantages can be achieved independently in various embodiments of the present inventions or may be combined in yet other embodiments.

DRAWINGS

These and other features, aspects, and advantages of the present disclosure will become better understood with regard to the following description, appended claims, and accompanying drawings where:

FIG. 8 shows a chart illustrating the advantages of the disclosed uni-fiber lasercom terminal design over a conventional lasercom terminal design, in accordance with at least one embodiment of the present disclosure.

DESCRIPTION

The methods and apparatus disclosed herein provide an operative system for a uni-fiber (i.e. a single optical fiber) laser communications (lasercom) terminal. This disclosed system employs a simple and efficient uni-fiber lasercom terminal. The uni-fiber lasercom terminal design minimizes the amount of hardware required without sacrificing sensitivity. In particular, a single optical fiber is used for all signals, including but not limited to: the transmit beacon signal, the transmit communication signal, the receive acquisition signal, and the receive communication signal.

The uni-fiber design of the uni-fiber lasercom terminal is enabled by the use of several features that are not commonly found in conventional lasercom terminals. Specifically, these features include, but are not limited to, a cat's eye reflector to assist in acquisition, a unique fiber ferrule designed to bring the reflector as close to the fiber core as possible while minimizing back-reflection of the fiber transmit signal, a special acquisition pulse code for transmit/receive isolation of a single wavelength, and a bi-directional optical amplifier (optical amp) to provide amplification for all signal paths. These features enable the optical head to be simplified to a single actuated fiber at the back focal plane of a focusing element (e.g., a lens or a reflective telescope), thereby making the uni-fiber lasercom terminal easy to integrate onto platforms with low payload size, weight, and power (SWaP) capabilities. It should be noted that the disclosed uni-fiber lasercom terminal design is well suited for short range applications that do not require point-ahead.

Current, conventional, lasercom terminals require a relatively large receive aperture along with lots of internal small beam space optics. Conversely, the disclosed uni-fiber lasercom terminal design provides a low size, low weight, and low power lasercom terminal.

In the following description, numerous details are set forth in order to provide a more thorough description of the system. It will be apparent, however, to one skilled in the art, that the disclosed system may be practiced without these specific details. In the other instances, well known features have not been described in detail so as not to unnecessarily obscure the system.

Figure 1:
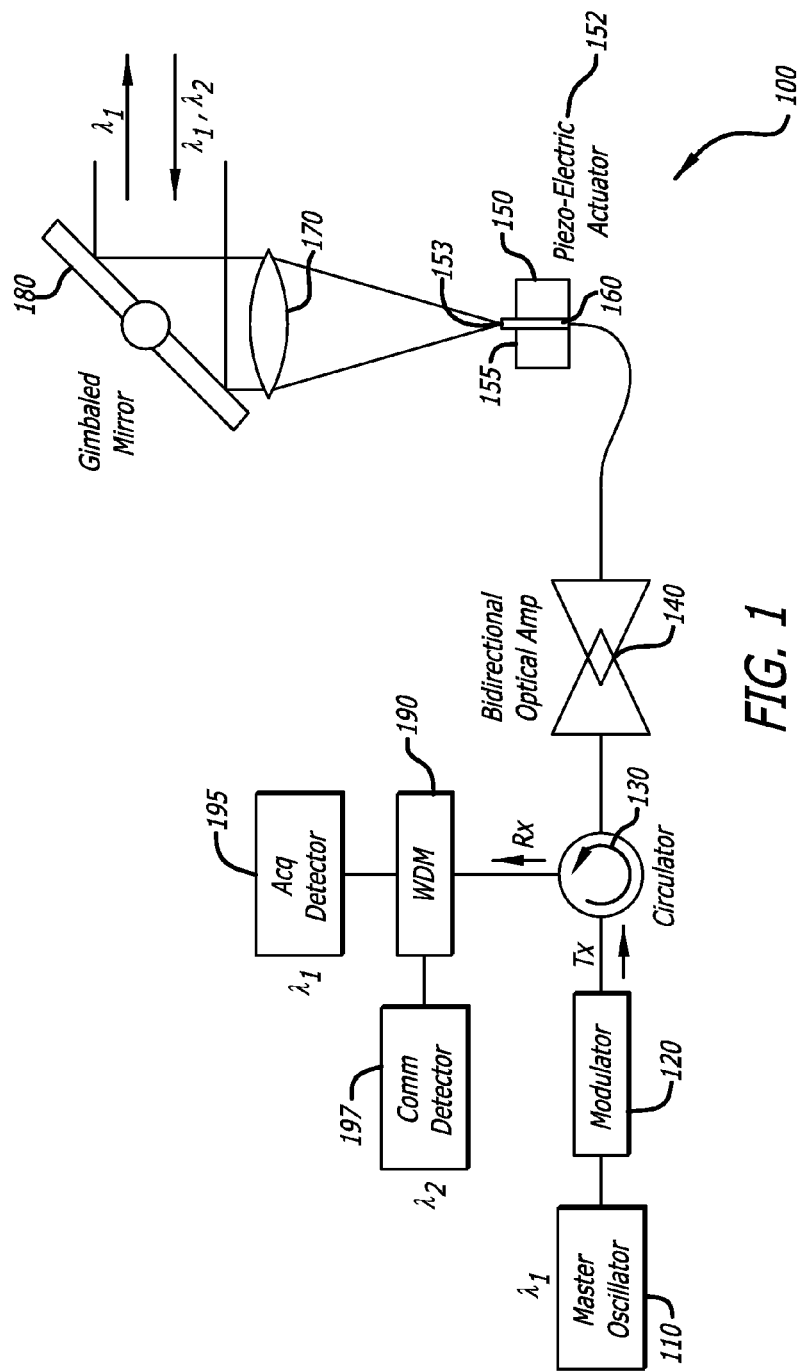
FIG. 1 shows a schematic diagram of a uni-fiber (i.e. a single optical fiber) laser communications (lasercom) terminal, in accordance with at least one embodiment of the present disclosure.
Figure 2:
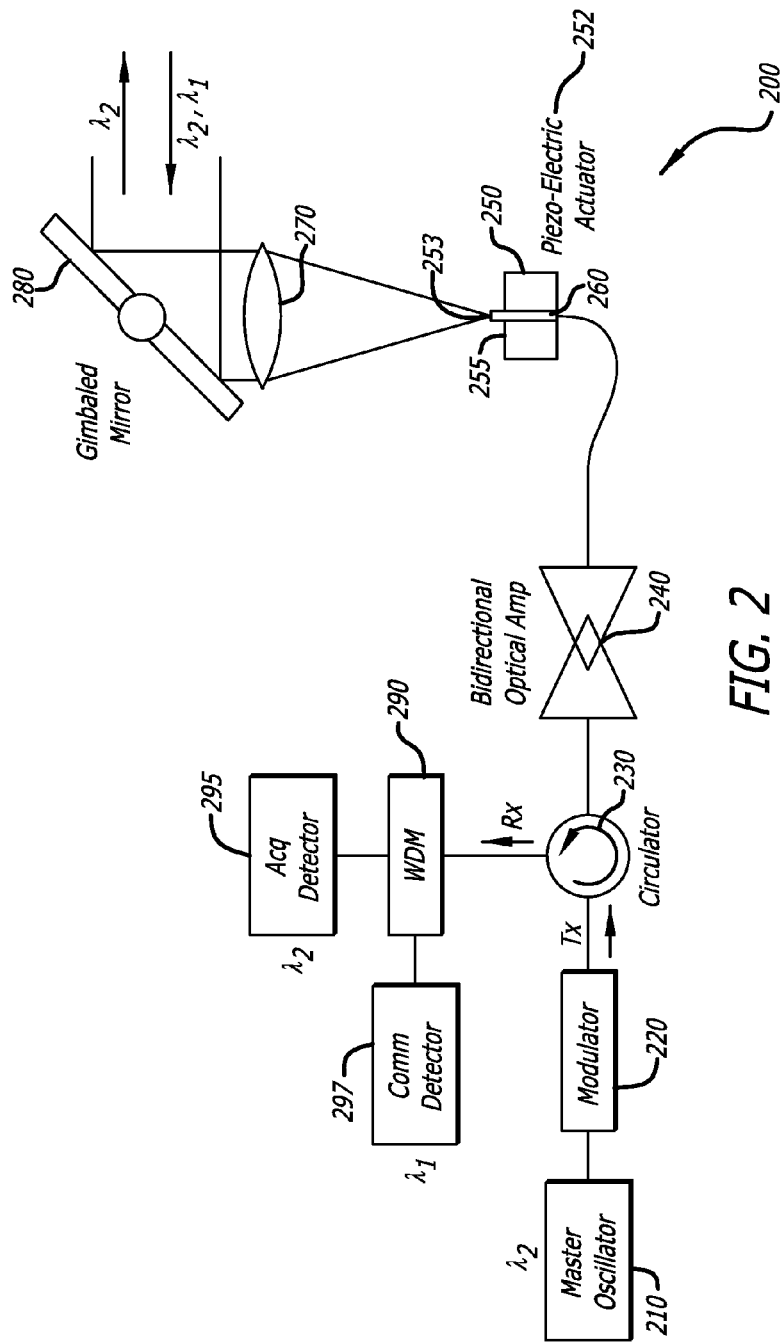
FIG. 2 shows a schematic diagram of a second uni-fiber laser lasercom terminal to be used in conjunction with the uni-fiber lasercom terminal of FIG. 1, in accordance with at least one embodiment of the present disclosure.
Figure 3:
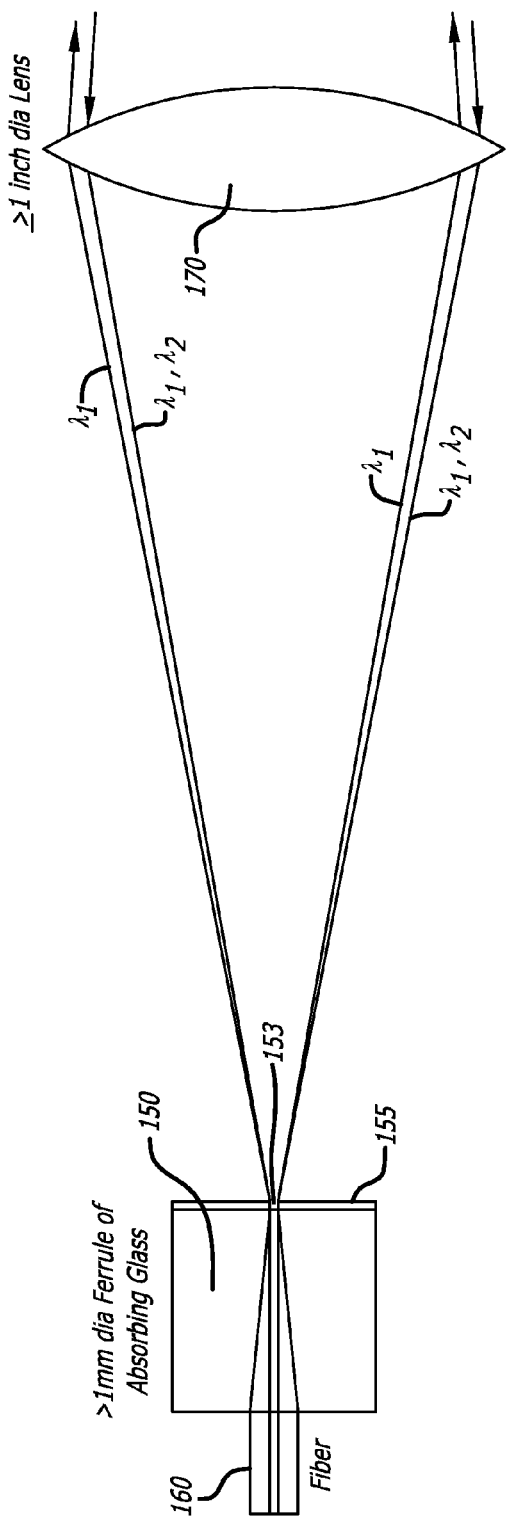
FIG. 3 shows a diagram of the ferrule surrounding the optical fiber and the lens of the uni-fiber lasercom terminal of FIG. 1, in accordance with at least one embodiment of the present disclosure.

FIG. 1 shows a schematic diagram of a uni-fiber (i.e. a single optical fiber) laser communications (lasercom) terminal 100, in accordance with at least one embodiment of the present disclosure. FIG. 2 shows a schematic diagram of a second uni-fiber laser lasercom terminal 200 to be used in conjunction with the uni-fiber lasercom terminal 100 (i.e. the first terminal) of FIG. 1, in accordance with at least one embodiment of the present disclosure. It should be noted that the design of the second terminal 200 of FIG. 2 is the same as the design of the first terminal 100 of FIG. 1 except for that the master oscillator 110 of the first terminal 100 generates a first signal having a first wavelength ($\lambda_1$) and the master oscillator 210 of the second terminal 200 generates a second signal having a second wavelength ($\lambda_2$); the acquisition detector 195 of the first terminal 100 detects a first signal having a first wavelength ($\lambda_1$) and the acquisition detector 295 of the second terminal 200 detects a second signal having a second wavelength ($\lambda_2$); and the communication detector 197 of the first terminal 100 detects a second signal having a second wavelength ($\lambda_2$) and the communication detector 297 of the second terminal 200 detects a first signal having a first wavelength ($\lambda_1$). As such, it follows that the modulator 120 of the first terminal 100 and the modulator 220 of the second terminal 200 are the same, the circulator 130 of the first terminal 100 and the circulator 230 of the second terminal 200 are the same, the bi-directional optical amplifier (optical amp) 140 of the first terminal 100 and the bi-directional optical amp 240 of the second terminal 200 are the same, the wavelength division multiplexer (WDM) 190 of the first terminal 100 and the WDM 290 of the second terminal 200 are the same, the ferrule 150 of the first terminal 100 and the ferrule 250 of the second terminal 200 are the same, the lens 170 of the first terminal 100 and the lens 270 of the second terminal 200 are the same, the gimbaled mirror 180 of the first terminal 100 and the gimbaled mirror 280 of the second terminal 200 are the same, and the piezo-electric actuator 152 of the first terminal 100 and the piezo-electric actuator 252 of the second terminal 200 are the same. In addition, it should be noted that it is understood that both the terminal 100 of FIG. 1 and the terminal of FIG. 2 include a filter(s) (not depicted in FIGS. 1 and 2) to filter the received signals (i.e. the first signal and the second signal), and the filter(s) is located prior to the detectors (i.e. the communication detectors 197, 297 and the acquisition detectors 195, 295). FIG. 3 shows a diagram of the ferrule 150 surrounding the optical fiber 160 and the lens 170 of the uni-fiber lasercom terminal 100 of FIG. 1, in accordance with at least one embodiment of the present disclosure.

In order to better understand the operation of the first terminal 100 of FIG. 1 used in conjunction with the second terminal 200 of FIG. 2, FIGS. 1, 2, and 3 will be described in combination with one another. Referring to FIG. 1, a master oscillator 110 is shown to generate the first signal having a first wavelength ($\lambda_1$). A modulator 120 is then used to modulate the first signal. After the first signal is modulated, a circulator 130 circulates the first signal to a bi-directional optical amp 140. The bi-directional optical amp 140 then amplifies the first signal. Once the first signal is amplified by the bi-directional optical amp 140, the first signal passes through a ferrule 150 surrounding the optical fiber 160.

Referring to FIG. 3, It should be noted that the ferrule 150 of the first terminal 100 is manufactured from light-absorbing glass (or, alternatively, from other materials), and the ferrule 150 is approximately greater than or equal to ($\geq$) one (1) millimeter (mm) in diameter. It should also be noted that the input/output end of the ferrule 150 surrounding the optical fiber 160 is coated with a high reflective coating 155, which creates a cat's eye reflector. In addition, it should be noted that the input/output tip of the optical fiber 160 is coated with an anti-reflection coating 153. It should be noted that the fiber and ferrule may be tapered to minimize backreflection of the transmitted signal by reflective coating 155. Additionally, it should be noted that the lens 170 is approximately 1 inch in diameter and located approximately one focal length away from the fiber. Similarly, referring to FIG. 2, the ferrule 250 of the second terminal 200 is manufactured from light-absorbing glass (or, alternatively, from other materials); the ferrule 250 is approximately $\geq 1$ mm in diameter; the input/output end of the ferrule 250 surrounding the optical fiber 260 is coated with a high reflective coating 255, which creates a cat's eye reflector; the input/output tip of the optical fiber 260 is coated with an anti-reflection coating 253; the fiber and ferrule may be tapered to minimize backreflection of the transmitted signal by reflective coating 255; and the lens 270 is approximately $\geq 1$ inch in diameter and located approximately one focal length away from the fiber.

Referring to FIGS. 1, 2, and 3 together, after the first signal passes through a ferrule 150 surrounding the optical fiber 160 of the first terminal 100, the first signal is then propagated through a lens 170 of the first terminal 100, reflected off a gimbaled mirror 180 of the first terminal 100, and transmitted to a second terminal 200. It should be noted that in other embodiments, more than one lens 170, 270 may be employed by the first terminal 100 and/or the second terminal 200. It should also be noted that the mirror 180, 280 of the first terminal 100 and/or the second terminal 200 may or may not be manufactured to have gimballing capability. Additionally, it should be noted that more than one mirror 180, 280 may be employed by the first terminal 100 and/or the second terminal 200.

Once the first signal is transmitted from the first terminal 100 to the second terminal 200, the first signal reflects off of a reflective coating 255 on an end of the ferrule 250 surrounding the optical fiber 260 of the second terminal 200. After the first signal is reflected off of the reflective coating 255 of the second terminal 200, the first signal is reflected back to the first terminal 100. The first signal is then reflected off the gimbaled mirror 180 of the first terminal, and propagated through the lens 170 and the optical fiber 160 of the first terminal 100.

Referring to FIG. 2, optionally (i.e. for embodiments where the first terminal 100 is not a transmit only communications system, but rather is a transmit and receive communications system), the master oscillator 210 of the second terminal 200 generates a second signal having a second wavelength ($\lambda_2$). A modulator 220 is then used to modulate the second signal. After the second signal is modulated, a circulator 230 circulates the second signal to a bi-directional optical amp 240. The bi-directional optical amp 240 then amplifies the second signal. Once the second signal is amplified by the bi-directional optical amp 240, the second signal passes through the ferrule 250 surrounding the optical fiber 260. The second signal is then propagated through a lens 270 of the second terminal 200, reflected off a gimbaled mirror 280 of the second terminal 200, and transmitted to the first terminal 100. Referring back to FIG. 1, the second signal is then reflected off the gimbaled mirror 180 of the first terminal, and propagated through the lens 170 and optical fiber 160 of the first terminal 100.

Then, the bi-directional optical amp 140 of the first terminal 100 amplifies a third signal, which comprises the reflected first signal and/or the second signal. After the third signal is amplified, the circulator 130 circulates the amplified third signal to a wavelength division multiplexer (WDM) 190. The WDM 190 then separates the third signal into the first reflected signal and/or the second signal. After the third signal is separated into the first reflected signal and the second signal, an acquisition detector 195 detects the first reflected signal, and a communication detector 197 detects the second signal. A piezo-electric actuator 152 associated with the ferrule 150 nutates the ferrule 150 to generate a tracking signal and translates the ferrule 150 into proper alignment according to feedback from the acquisition detector 195 regarding the reflected first signal. It should be noted that in other embodiments, the ferrule 150 may be nutated and/or translated by means other than by a piezo-electric actuator 152.

Figure 4:
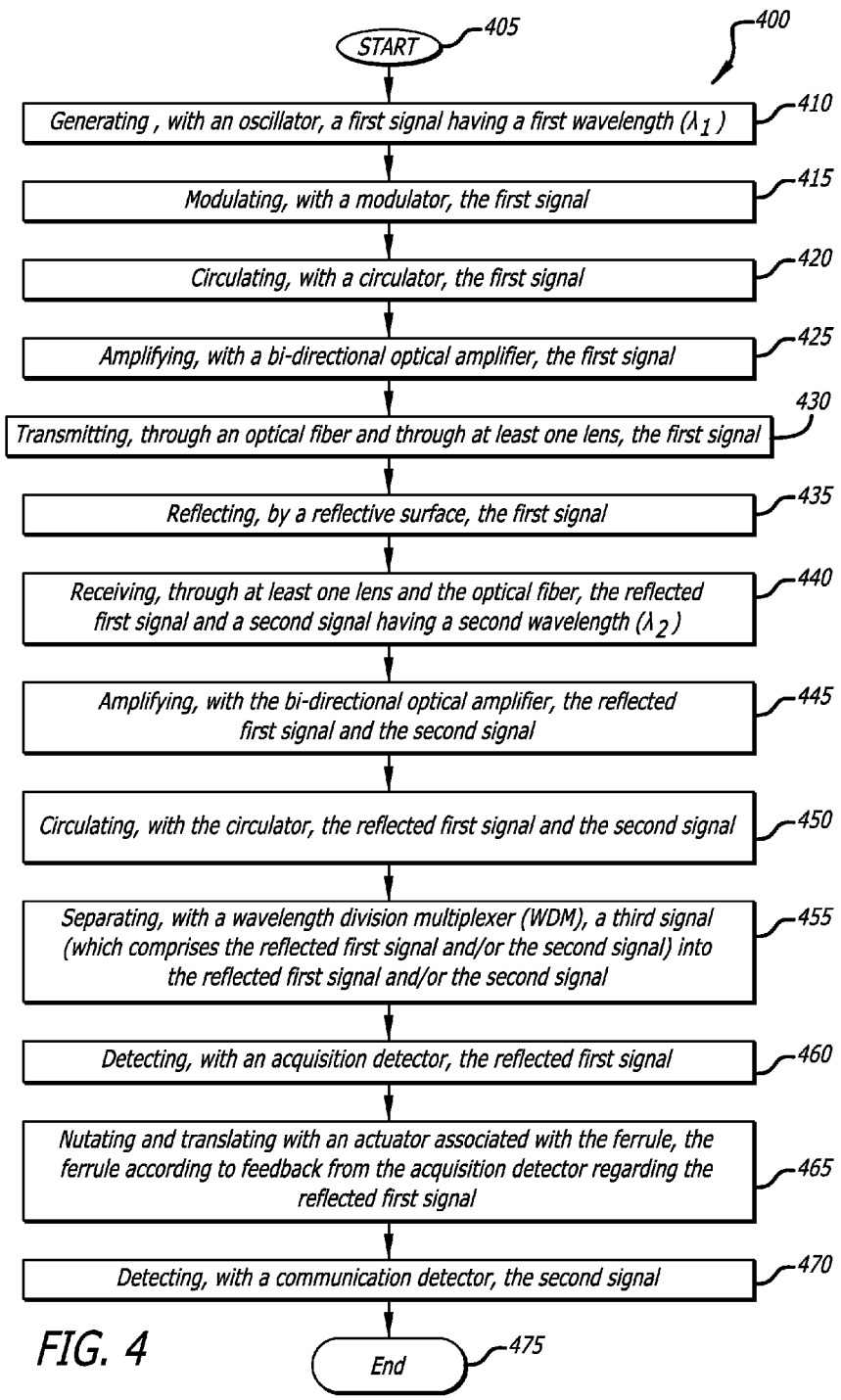
FIG. 4 shows a flow chart for the method of operation of the terminal of FIG. 1 in conjunction with the terminal of FIG. 2, in accordance with at least one embodiment of the present disclosure.

FIG. 4 shows a flow chart for the method 400 of operation of the first terminal 100 of FIG. 1 in conjunction with the second terminal 200 of FIG. 2, in accordance with at least one embodiment of the present disclosure. At the start 405 of the method 400, an oscillator associated with the first terminal generates a first signal having a first wavelength ($\lambda_1$) 410. A modulator associated with the first terminal then modulates the first signal 415. After the first signal is modulated, a circulator associated with the first terminal circulates the first signal 420. Then, a bi-directional optical amp associated with the first terminal amplifies the first signal 425. After the first signal is amplified, the first signal is transmitted through an optical fiber associated with the first terminal and through at least one lens associated with the first terminal 430. The first signal is then reflected by a reflective surface of the second terminal 435. Then, the reflected first signal and a second signal, which is transmitted from the second terminal and has a second wavelength ($\lambda_2$), are received through at least one lens associated with the first terminal and the optical fiber of the first terminal 440.

After the first terminal receives the reflected first signal and the second signal, the bi-directional optical amp associated with the first terminal amplifies the reflected first signal and the second signal 445. After the reflected first signal and the second signal are amplified, the circulator associated with the first terminal circulates the reflected first signal and the second signal 450. Then, a wavelength division multiplexer (WDM) associated with the first terminal separates a third signal (which comprises the reflected first signal and/or the second signal) into the reflected first signal and/or the second signal 455. After the reflected first signal and the second signal are separated, an acquisition detector associated with the first terminal detects the reflected first signal 460. Then, an actuator, associated with the first terminal, nutates and translates the ferrule surrounding the optical fiber of the first terminal according to feedback from the acquisition detector of the first terminal regarding the reflected first signal 465. A communication detector associated with the first terminal then detects the second signal 470. Then, the method 400 ends 475.

It should be noted that for the disclosed uni-fiber lasercom terminal design, it will be necessary to isolate the transmitted (TX) acquisition signal (e.g., the transmitted first signal having a first wavelength ($\lambda_1$) from the first terminal 100 of FIG. 1) from the received (RX) acquisition signal (e.g., the reflected first signal having a first wavelength ($\lambda_1$), which is the first signal reflected off of the second terminal 200 of FIG. 2). There are various techniques that may be employed to perform the isolation. Three exemplary techniques are illustrated in FIGS. 5A, 5B, and 5C.

Figure 5A:
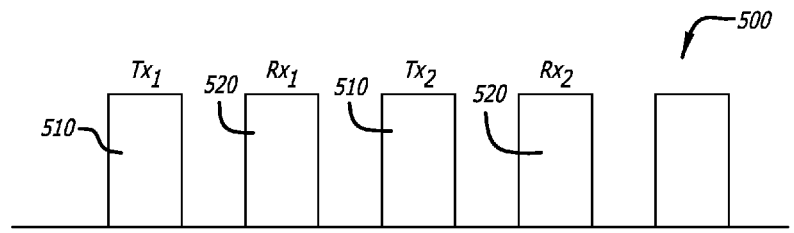
FIG. 5A shows a graph depicting a first technique, based on time division multiple access (TDMA), for isolation of the transmitted and the reflected first signal, in accordance with at least one embodiment of the present disclosure.

FIG. 5A shows a graph 500 depicting a first technique, based on time division multiple access (TDMA), for isolation of the transmitted and the reflected first signal, in accordance with at least one embodiment of the present disclosure. In this figure, a pulse train 510 of transmit acquisition signals ($Tx_1$, $Tx_2$) is transmitted at a specific time interval such that the return pulses 520 of the receive acquisition signals ($Rx_1$, $Rx_2$) will arrive approximately half-way in between the transmit pulses 510. For this technique, an expected range (i.e. distance) between the first terminal and the second terminal would need to be known or derived with an accuracy of about 25%. However, it should be noted that for ranging distances of 10 to 100 kilometers (km) between terminals, the pulse rate would be approximately from 0.7 to 7 kilopulses per second (kpps), which would be undesirably slow for conventional optical amps.

Figure 5B:
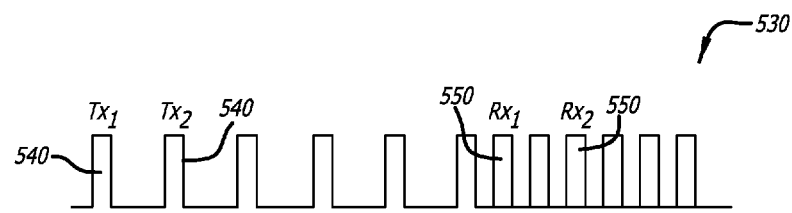
FIG. 5B shows a graph depicting a second technique, based on TDMA, for isolation of the transmitted and the reflected first signal, in accordance with at least one embodiment of the present disclosure.

FIG. 5B shows a graph 530 depicting a second technique, based on TDMA, for isolation of the transmitted and the reflected first signal, in accordance with at least one embodiment of the present disclosure. In this figure, the rate of the pulse train 540 of the transmit acquisition signals ($Tx_1$, $Tx_2$) is increased such that multiple transmit pulses 540 remain in flight. This technique requires a more accurate knowledge of the range between the terminals to keep the return pulses 550 of the receive acquisition signals ($Rx_1$, $Rx_2$) in between the transmit pulses 540. When using this technique, to achieve a pulse rate of 0.5 megapulses per second (Mpps), the range between the terminals will need to be known (or derived) to within 75 meters of accuracy.

Figure 5C:
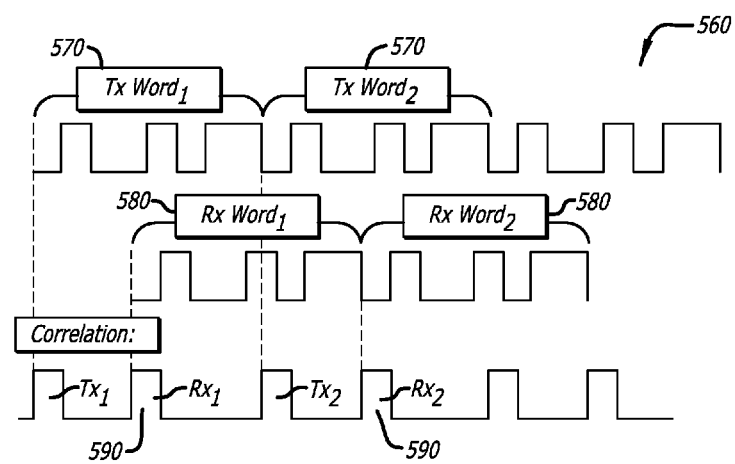
FIG. 5C shows a graph depicting a third technique, based on correlation detection, for isolation of the transmitted and the reflected first signal, in accordance with at least one embodiment of the present disclosure.

FIG. 5C shows a graph 560 depicting a third technique, based on correlation detection, for isolation of the transmitted and the reflected first signal, in accordance with at least one embodiment of the present disclosure. In this figure, pulse code words (Tx Word$_1$, Tx Word$_2$) 570 are transmitted and return code words (Rx Word$_1$, Rx Word$_2$) 580 are received. A correlation decoder is used to decode the return pulses 590. For this technique, the range between the terminals only needs to be known (or derived) to within 1.1 km of accuracy in order to achieve 1 Mbps of on-off keying (OOK) code with a 31 bit code word length. It should be noted that various correlation techniques may be employed including, but not limited to, auto correlation, matched filter, Kalman filter, and hypothesis testing.

Figure 6:
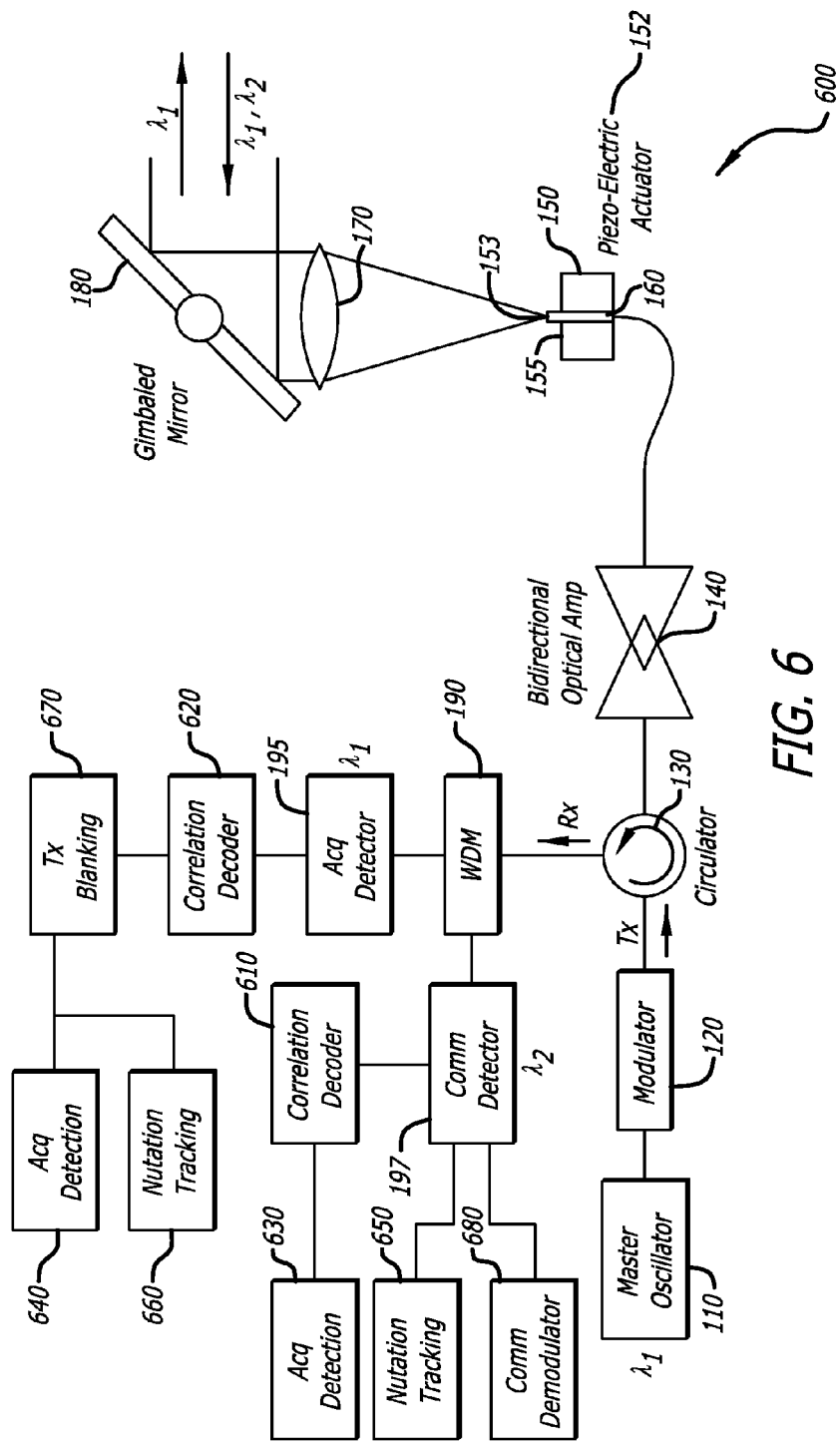
FIG. 6 shows a schematic diagram of a uni-fiber lasercom terminal that utilizes the isolation technique of FIG. 5C, in accordance with at least one embodiment of the present disclosure.

FIG. 6 shows a schematic diagram of a uni-fiber lasercom terminal 600 that utilizes the isolation technique of FIG. 5C, in accordance with at least one embodiment of the present disclosure. It should be noted that the design of the terminal 600 of FIG. 6 is the same as the design of the first terminal 100 of FIG. 1 except for that the terminal 600 of FIG. 6 includes additional components including, but not limited to, two correlation decoders 610, 620, two additional acquisition detectors 630, 640, two nutation tracking units 650, 660, a transmit blanking unit 670, and a communication demodulator 680. The correlation decoders 620, 610 are used to decode the received reflected first signal and the second signal, respectively. The transmit blanking unit 670 is used to remove the transmit pulses from the reflected first signal, which has a first wavelength ($\lambda_1$). The acquisition detectors 640, 630 are used to detect the receive pulses from the reflected first signal and the second signal, respectively. The nutation tracking units 660, 650 are used to provide feedback to the piezo-electric actuator 152 regarding the first reflected signal and the second signal, respectively. The communication demodulator 680 is used to demodulate the detected second signal.

Figure 7:
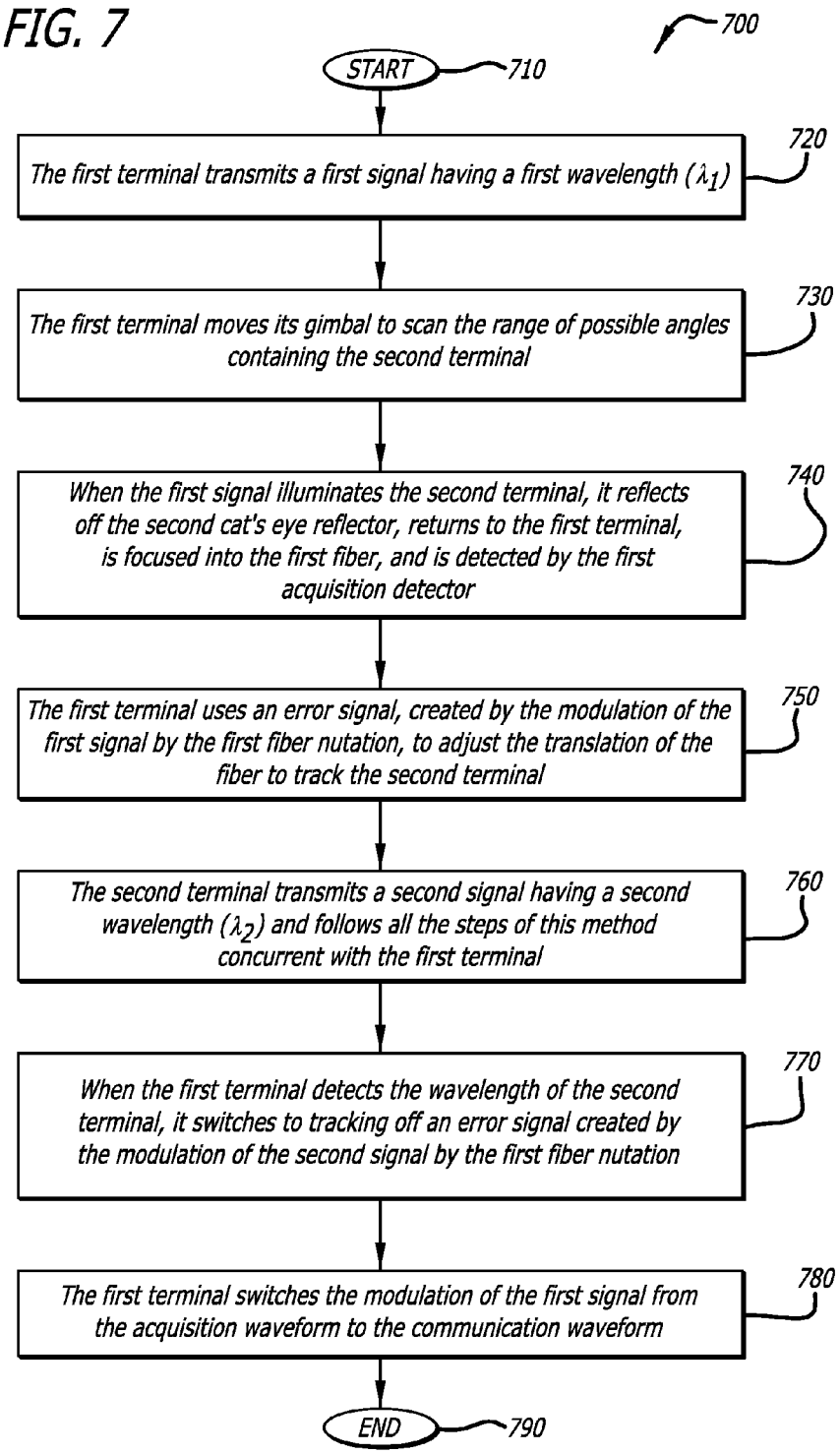
FIG. 7 shows a flow chart for the method of operation of the terminal in FIG. 1 acquiring, tracking, and communicating with the terminal of FIG. 2, in accordance with at least one embodiment of the present disclosure.

FIG. 7 shows a flow chart for the method 700 of operation of the terminal 100 in FIG. 1 acquiring, tracking, and communicating with the terminal 200 of FIG. 2, in accordance with at least one embodiment of the present disclosure. At the start 710 of the method 700, the first terminal transmits a first signal having a first wavelength ($\lambda_1$) 720. Then, the first terminal moves its gimbal (e.g., gimbals its mirror(s)) to scan the range of possible angles containing the second terminal 730. When the first signal illuminates the second terminal, the first signal refects off the second cat's eye reflector (i.e. the cat's eye reflector on the second terminal), is focused into the first fiber (i.e. the fiber of the first terminal), and is detected by the first acquisition detector (i.e. the acquisition detector of the first terminal) 740. Then, the first terminal uses an error signal, created by the modulation of the first signal by the first fiber nutation, to adjust the translation of the first fiber to track the second terminal 750. The second terminal then transmits a second signal having a second wavelength ($\lambda_2$) and follows all of the steps of this method concurrent with the first terminal (i.e. steps 720-780) 760. When the first terminal detects the wavelength of the second terminal (i.e. the second wavelength), the first terminal switches to tracking off an error signal created by the modulation of the second signal by the first fiber nutation 770. The first terminal then switches the modulation of the first signal from the acquisition waveform (i.e. the waveform of FIG. 5) to the communication waveform (i.e. the waveform used to send data to the communication detector in the second terminal) 780. Then, the method 700 ends 790.

FIG. 8 shows a chart 800 illustrating the advantages of the disclosed uni-fiber lasercom terminal design over a conventional lasercom terminal design, in accordance with at least one embodiment of the present disclosure. In particular, this chart 800 shows the advantages of a number of features of the disclosed uni-fiber lasercom terminal design over the features of a conventional lasercom terminal design. One advantage relates to the feature of aperture size. For this feature, the disclosed uni-fiber design has an aperture size of only 1.0 inch, while the comparable conventional terminal design has an aperture size of 3.5 inches. A second advantage relates to the feature of the optical head dimensions. For this feature, the disclosed uni-fiber design has optical head dimensions of only 3 inches×4 inches×7 inches, while the comparable conventional terminal design has optical head dimensions of 13.5 inches×13.5 inches×24.0 inches. A third advantage relates to the feature of mass (i.e. the mass for the optics and the electronics). For this feature, the disclosed uni-fiber design has a mass of only 5 pounds (lbs) for the optics and a mass of 54 lbs for the electronics, while the comparable conventional terminal design has a mass of 50 lbs for the optics and a mass of 54 lbs for the electronics. A fourth advantage relates to the feature of transmit (Tx) power. For this feature, the disclosed uni-fiber design has a transmit power of 250 milliwatts (mW), while the comparable conventional terminal design has a transmit power of 500 mW. A fifth advantage relates to the feature of power consumption. For this feature, the disclosed uni-fiber design consumes only 60 Watts (W) of power, while the comparable conventional terminal design consumes 82 W of power.

Although certain illustrative embodiments and methods have been disclosed herein, it can be apparent from the foregoing disclosure to those skilled in the art that variations and modifications of such embodiments and methods can be made without departing from the true spirit and scope of the art disclosed. Many other examples of the art disclosed exist, each differing from others in matters of detail only. Accordingly, it is intended that the art disclosed shall be limited only to the extent required by the appended claims and the rules and principles of applicable law.

I claim:

1. A method for a uni-fiber laser communications (lasercom) terminal, the method comprising:
    generating, with an oscillator, a first signal having a first wavelength;
    modulating, with a modulator, the first signal;
    circulating, with a circulator, the first signal;
    amplifying, with a bi-directional optical amplifier (optical amp), the first signal;
    transmitting, through an optical fiber, the first signal, wherein the optical fiber is embedded in a ferrule, and an end of the ferrule is coated with a reflective coating;
    transmitting, through at least one lens, the first signal;
    receiving, through the at least one lens and the optical fiber, the first signal;
    amplifying, with the bi-directional optical amp, the first signal;
    circulating, with the circulator, the first signal;
    detecting, with an acquisition detector, the first signal; and
    nutating and translating, with an actuator associated with the ferrule, the ferrule according to feedback from the acquisition detector regarding the first signal.

2. The method of claim 1, wherein the method further comprises:
    receiving, through the at least one lens and the optical fiber, a second signal having a second wavelength;
    amplifying, with the bi-directional optical amp, the second signal;
    circulating, with the circulator, the second signal;
    separating, with a wavelength division multiplexer (WDM), a third signal, which comprises the first signal and the second signal, into the first signal and the second signal; and
    detecting, with a communication detector, the second signal.

3. The method of claim 2, wherein the method further comprises reflecting at least one of the first signal and the second signal off at least one mirror associated with the at least one lens.

4. The method of claim 3, wherein at least one of the at least one mirror is capable of being gimbaled.

5. The method of claim 1, wherein the actuator is a piezo-electric actuator.

6. The method of claim 1, wherein the reflective coating on the end of the ferrule is a cat's eye reflector.

7. The method of claim 1, wherein the detecting of the first signal by the acquisition detector is achieved by at least one of time division multiple access (TDMA) and correlation detection.

8. The method of claim 1, wherein at least one of the optical fiber and the ferrule are tapered to minimize backreflection.

9. A uni-fiber laser communications (lasercom) terminal apparatus, the apparatus comprising:
- an oscillator to generate a first signal having a first wavelength;
- a modulator to modulate the first signal;
- a circulator to circulate the first signal;
- a bi-directional optical amplifier (optical amp) to amplify the first signal;
- an optical fiber; wherein the optical fiber is embedded in a ferrule, and an end of the ferrule is coated with a reflective coating;
- at least one lens, wherein the first signal is transmitted through and is received through the optical fiber and the at least one lens;
- an acquisition detector to detect the first signal; and
- an actuator associated with the ferrule to nutate and translate the ferrule according to feedback from the acquisition detector regarding the first signal.

10. The apparatus of claim 9, wherein the apparatus further comprises:
- the bi-directional optical amp to further amplify a second signal, having a second wavelength, that is received through the optical fiber and the at least one lens;
- the circulator to further circulate the second signal;
- a wavelength division multiplexer (WDM) to separate a third signal, which comprises the first signal and the second signal, into the first signal and the second signal; and
- a communication detector to detect the second signal.

11. The apparatus of claim 10, wherein the apparatus further comprises at least one mirror, associated with the at least one lens, to reflect at least one of the first signal and the second signal.

12. The apparatus of claim 11, wherein at least one of the at least one mirror is capable of being gimbaled.

13. The apparatus of claim 9, wherein the actuator is a piezo-electric actuator.

14. The apparatus of claim 9, wherein the reflective coating on the end of the ferrule is a cat's eye reflector.

15. The apparatus of claim 9, wherein the acquisition detector detects the first signal by at least one of time division multiple access (TDMA) and correlation detection.

16. The apparatus of claim 9, wherein at least one of the optical fiber and the ferrule are tapered to minimize backreflection.

17. A method for operating a uni-fiber laser communications (lasercom) terminal system, the method comprising:
- generating, with an oscillator associated with a first terminal, a first signal having a first wavelength;
- modulating, with a modulator associated with the first terminal, the first signal;
- circulating, with a circulator associated with the first terminal, the first signal;
- amplifying, with a bi-directional optical amplifier (optical amp) associated with the first terminal, the first signal;
- transmitting, through an optical fiber associated with the first terminal, the first signal, wherein the optical fiber is embedded in a ferrule, and an end of the ferrule is coated with a reflective coating;
- transmitting, through at least one lens associated with the first terminal, the first signal;
- reflecting, by a reflective surface associated with a second terminal, the first signal;
- receiving, by the first terminal through the at least one lens associated with the first terminal and the optical fiber associated with the first terminal, the reflected first signal;
- amplifying, with the bi-directional optical amp associated with the first terminal, the reflected first signal;
- circulating, with the circulator associated with the first terminal, the reflected first signal;
- detecting, with an acquisition detector associated with the first terminal, the reflected first signal; and
- nutating and translating, with an actuator associated with the ferrule of the first terminal, the ferrule of the first terminal according to feedback from the acquisition detector regarding the reflected first signal.

18. The method of claim 17, wherein the method further comprises:
- receiving, by the first terminal through the at least one lens associated with the first terminal and the optical fiber associated with the first terminal, a second signal from the second terminal, wherein the second signal has a second wavelength;
- amplifying, with the bi-directional optical amp associated with the first terminal, the second signal;
- circulating, with the circulator associated with the first terminal, the second signal;
- separating, with a wavelength division multiplexer (WDM) associated with the first terminal, a third signal, which comprises the first signal and the second signal, into the first signal and the second signal; and
- detecting, with a communication detector associated with the first terminal, the second signal.

19. The method of claim 18, wherein the method further comprises reflecting at least one of the first signal and the second signal off at least one mirror associated with the at least one lens associated with the first terminal.

20. The method of claim 19, wherein at least one of the at least one mirror is capable of being gimbaled.

21. The method of claim 17, wherein the actuator associated with the first terminal is a piezo-electric actuator.

22. The method of claim 17, wherein the reflective coating on the end of the ferrule of the first terminal is a cat's eye reflector.

23. The method of claim 17, wherein the detecting of the first signal by the acquisition detector is achieved by at least one of time division multiple access (TDMA) and correlation detection.

24. The method of claim 17, wherein the reflective surface associated with the second terminal is a cat's eye reflector.

25. The method of claim 17, wherein at least one of the optical fiber and the ferrule are tapered to minimize backreflection.

26. A system for uni-fiber laser communications (lasercom) terminals, the system comprising:
- an oscillator, associated with a first terminal, to generate a first signal having a first wavelength;
- a modulator, associated with the first terminal, to modulate the first signal;
- a circulator, associated with the first terminal, to circulate the first signal;
- a bi-directional optical amplifier (optical amp), associated with the first terminal, to amplify the first signal;
- an optical fiber associated with the first terminal, wherein the optical fiber is embedded in a ferrule, and an end of the ferrule is coated with a reflective coating;
- at least one lens associated with the first terminal, wherein the first signal is transmitted through and is received through the optical fiber associated with the first terminal and the at least one lens associated with the first terminal;
- a reflective surface, associated with a second terminal, to reflect the first signal;

an acquisition detector, associated with the first terminal, to detect the reflected first signal; and an actuator, associated with the ferrule of the first terminal, to nutate and translate the ferrule of the first terminal according to feedback from the acquisition detector regarding the reflected first signal.

27. The system of claim 26, wherein the system further comprises:

the bi-directional optical amp, associated with the first terminal, to further amplify a second signal, from the second terminal and having a second wavelength, that is received through the optical fiber associated with the first terminal and the at least one lens associated with the first terminal;

the circulator, associated with the first terminal, to further circulate the second signal;

a wavelength division multiplexer (WDM), associated with the first terminal, to separate a third signal, which comprises the first signal and the second signal, into the first signal and the second signal; and a communication detector, associated with the first terminal, to detect the second signal.

28. The system of claim 27, wherein the system further comprises at least one mirror, associated with the at least one lens of the first terminal, to reflect at least one of the first signal and the second signal.

29. The system of claim 28, wherein at least one of the at least one mirror is capable of being gimbaled.

30. The system of claim 26, wherein the actuator is a piezo-electric actuator.

31. The system of claim 26, wherein the reflective coating on the end of the ferrule of the first terminal is a cat's eye reflector.

32. The system of claim 26, wherein the acquisition detector, associated with the first terminal, detects the reflected first signal by at least one of time division multiple access (TDMA) and correlation detection.

33. The system of claim 26, wherein the reflective surface associated with the second terminal is a cat's eye reflector.

34. The system of claim 26, wherein at least one of the optical fiber and the ferrule are tapered to minimize backreflection.

* * * * *